United States Patent
Tang et al.

(10) Patent No.: US 10,407,762 B2
(45) Date of Patent: Sep. 10, 2019

(54) MASK FORMULATION TO PREVENT ALUMINIZING ONTO THE PRE-EXISTING CHROMIDE COATING

(71) Applicants: Zhihong Tang, Carmel, IN (US); Kevin E Garing, Indianapolis, IN (US)

(72) Inventors: Zhihong Tang, Carmel, IN (US); Kevin E Garing, Indianapolis, IN (US)

(73) Assignee: PRAXAIR S. T. TECHNOLOGY, INC., North Haven, CT (US)

(*) Notice: Subject to any disclaimer, the term of this patent is extended or adjusted under 35 U.S.C. 154(b) by 0 days.

(21) Appl. No.: 15/243,152

(22) Filed: Aug. 22, 2016

(65) Prior Publication Data
US 2017/0058390 A1 Mar. 2, 2017

Related U.S. Application Data

(60) Provisional application No. 62/211,036, filed on Aug. 28, 2015.

(51) Int. Cl.
| | | |
|---|---|---|
| B22F 7/00 | (2006.01) | |
| C23C 8/04 | (2006.01) | |
| C23C 8/08 | (2006.01) | |
| C09D 1/00 | (2006.01) | |
| C09D 5/10 | (2006.01) | |
| F01D 5/28 | (2006.01) | |
| C23C 10/04 | (2006.01) | |
| C23C 10/08 | (2006.01) | |
| C22C 19/05 | (2006.01) | |

(52) U.S. Cl.
CPC .............. *C23C 8/04* (2013.01); *C09D 1/00* (2013.01); *C09D 5/10* (2013.01); *C23C 8/08* (2013.01); *C23C 10/04* (2013.01); *C23C 10/08* (2013.01); *F01D 5/288* (2013.01); *C22C 19/057* (2013.01); *F05D 2220/32* (2013.01); *F05D 2230/31* (2013.01); *F05D 2300/175* (2013.01); *F05D 2300/177* (2013.01)

(58) Field of Classification Search
CPC .. C23C 8/04; C23C 8/08; C23C 10/04; C09D 1/00; F01D 5/288; F05D 2220/32; F05D 2230/31
USPC ....................................................... 428/548
See application file for complete search history.

(56) References Cited

U.S. PATENT DOCUMENTS

| | | |
|---|---|---|
| 4,208,453 A | 6/1980 | Baldi |
| 4,845,139 A | 7/1989 | Baldi |

(Continued)

FOREIGN PATENT DOCUMENTS

| | | |
|---|---|---|
| EP | 0346266 A1 | 12/1989 |
| GB | 2401117 A | 11/2004 |

OTHER PUBLICATIONS

Montero et al., Low-activity aluminide coatings for superalloys using a slurry process free of halide activators and chromates, Feb. 5, 2013, Surface & Coatings Technology, pp. 10-14 (Year: 2013).*

*Primary Examiner* — David Sample
*Assistant Examiner* — Mary I Omori
(74) *Attorney, Agent, or Firm* — Nilay S. Dalal

(57) ABSTRACT

A novel dual layer mask formulation is provided. In particular, the mask has a unique composition that protects the integrity of an underlying chromide coating, prevents chromium depletion from the chromide coating and prevents a subsequent aluminide coating from being deposited thereon.

16 Claims, 4 Drawing Sheets

(56) References Cited

U.S. PATENT DOCUMENTS

| | | | |
|---|---|---|---|
| 4,957,421 A | 9/1990 | Baldi | |
| 4,978,558 A | 12/1990 | Lamm | |
| 6,924,038 B1 * | 8/2005 | Hardy | C23C 10/04 264/122 |
| 2013/0029043 A1 * | 1/2013 | Trzcinski | C23C 10/04 427/253 |
| 2014/0287143 A1 * | 9/2014 | Murphy | C23C 10/04 427/282 |
| 2015/0197842 A1 * | 7/2015 | Tang | C23C 10/20 428/666 |

* cited by examiner

MASK FORMULATION TO PREVENT ALUMINIZING ONTO THE PRE-EXISTING CHROMIDE COATING

RELATED APPLICATIONS

This application claims the benefit of priority to U.S. provisional application Ser. No. 62/211,036 filed on Aug. 28, 2015, the disclosure of which is incorporated by reference herein in its entirety.

FIELD OF THE INVENTION

The present invention relates to a novel dual layer mask formulation. In particular, the present invention relates to a mask composition that protects the integrity of an underlying chromide coating and prevents chromium depletion therefrom while preventing an aluminide coating to be deposited thereon.

BACKGROUND OF THE INVENTION

Components of gas turbine engines, such as the blades and vanes of the hot sections within a gas turbine engine, are generally made of a nickel-based or cobalt-based superalloy for high-temperature strength and fatigue resistance. During operation, the components of the gas turbine engine are typically exposed to harsh environments that can damage the turbine components. Environmental damage can occur in various modes, including damages as a result of heat, oxidation, corrosion, hot corrosion, erosion, wear, fatigue or a combination of several degradation modes.

Today's turbine engine is designed and operated in such a way that the environmental conditions and consequently the types of environmental damages in different regions of a turbine component can vary significantly from one another. As a result, a gas turbine component is protected against environmental damages in different locations by different types of protective coatings.

As an example, FIG. 1 shows the various sections of a typical high-pressure turbine blade. The turbine blade has several sections, including an airfoil, a platform and under-platform regions. In service, the airfoil operates at the hottest regions of the turbine blade and is therefore subject to high-temperature oxidation. "Higher temperature" or "high temperature" as used herein and throughout refers to those temperatures generally recognized to cause oxidation to the airfoil region of a turbine blade during service life. Consequently, protection of the base materials of the airfoil regions generally requires an aluminide coating and optionally a thermal barrier coating. In contrast to the airfoil, the regions under the platform of a turbine engine, such as the shank and root, are exposed to relatively lower temperatures but subject to type II hot corrosion attack. Aluminide coating offers an insufficient protection against type II hot corrosion attack. Moreover, the brittleness of aluminide coating at such lower temperature leads to an accelerated stress-corrosion-cracking failure in those highly stressed regions. As a result, a chromide coating with the enhanced corrosion resistance is generally required in the under-platform region. A typical method to make such location-dependent coatings involves a chromide coating on the external surface of under-platform regions by a chromizing process, and then a subsequent separate aluminide coating on the internal and external surface of the airfoil by an aluminizing process.

The chromide coating provides protection against type II hot corrosion attack generally incurred by the under-platform regions. The type II hot corrosion attack tends to be particularly severe in the under-platform regions where sulfate particulates can accumulate on the surface and service temperature is in the range of 1250-1400° F. The chromide coating can be applied by a pack cementation, vapor phase or slurry chromizing process.

The aluminide coating provides an insufficient protection against type II hot corrosion attack, but offers excellent oxidation resistance at higher temperature. Aluminide coatings are generally formed by enriching the surface of component with aluminum. The formation of aluminide coating generally involves the use of a halide activator and aluminum donor material to generate an aluminizing coating gases, gaseous transport of aluminizing coating gases to the surface of the component being coated, reaction of aluminizing coating gases with the surface of component, and deposition and diffusion of aluminum into the surface of the component.

During the aluminizing process, aluminide coating deposition onto the pre-existing chromide coating should be prevented because any aluminum spillover onto chromide coating tends to significantly degrade the chromide coating's protection against type II hot corrosion attack. The effective way is the use of mask material. The mask material can provide an effective environmental barrier between the pre-existing chromide coating and the aluminizing coating gases during the aluminizing process. Moreover, the mask material should not react with the pre-existing chromide coating and therefore deplete the chromium content from chromide coating during the aluminizing process.

The conventional mask material currently used in the diffusion aluminizing industry was designed and developed to mask the nickel- or cobalt-based superalloy substrate. The conventional mask material typically comprises nickel metal powder or nickel alloy powder that can effectively getter aluminizing coating gases during aluminizing process and therefore prevent the deposition of aluminum onto the surface of superalloy substrate. Those masking compositions in the prior arts are well known and are described, for example, in U.S. Pat. Nos. 4,208,453 and 4,845,139 to Baldi. Those masking materials are commercially available, for example, M-1 maskant, M-7 maskant, and M-17 maskant from APV engineered coatings (Arkon, Ohio). The conventional masking materials are generally effective in preventing deposition of aluminide coating on nickel- or cobalt-based superalloy substrate. However, they are not effective in masking the pre-existing chromide coating during a subsequent aluminizing process as demonstrated in comparative example 1 and comparative example 2. It has been observed that conventional masking materials can cause aluminum spillover onto the underlying chromide coating and/or chemical reaction between mask materials and the chromide coating. Consequently, ineffective masking significantly weakens the performance of the chromide coating against type II hot corrosion attack, thereby shortening its service life.

Thus, an effective mask material is required to prevent the deterioration of the chromide coating onto the selected regions during aluminizing process. In view of the current unmet needs, a mask material is desired to provide an effective environmental barrier between the underlying chromide coating and the aluminizing coating gases during an aluminizing process. Moreover, the mask material should not react with the underlying chromide coating and should not significantly alter or affect the chemistry and microstructure of the underlying chromide coating.

SUMMARY OF THE INVENTION

In a first aspect of the present invention, a mask composition having a dual layer that prevents aluminizing of the selected regions of a turbine component having a pre-existing and underlying chromide coating, said dual layer comprising: an inner buffer layer consisting essentially of a slurry of mixed chromium-based powder and an inner inert ceramic powder in a binder solution; said chromium-based powder having a chromium activity equal to or higher than a chromium activity in the pre-existing and underlying chromide coating; and an outer getter layer overlying said inner buffer layer consisting essentially of nickel-based powder and an outer inert ceramic powder; wherein said mask composition substantially prevents aluminide coating deposition onto said pre-existing and underlying chromide coating, and prevents chromium depletion from said pre-existing and underlying chromide coating, thereby maintaining the structural integrity of the pre-existing and underlying chromide coating.

The invention may include any of the aspects in various combinations and embodiments to be disclosed herein.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein.

DETAILED DESCRIPTION OF THE INVENTION

The objectives and advantages of the invention will be better understood from the following detailed description of the embodiments thereof in connection. The present disclosure relates to a novel dual layer mask formulation for protecting the integrity of an underlying chromide coating while preventing subsequent aluminide coating deposition onto the underlying chromide coating and chromium depletion from the underlying chromide coating. As a result, other regions of the turbine component which are not masked can be exposed to a high-temperature aluminizing coating gases to deposit an aluminide coating therealong for protection against high-temperature oxidation.

The disclosure is set out herein in various embodiments and with reference to various aspects and features of the invention. Unless indicated otherwise, all percentages herein are expressed as weight percentages.

The relationship and functioning of the various elements of this invention are better understood by the following detailed description. The detailed description contemplates the features, aspects and embodiments in various permutations and combinations, as being within the scope of the disclosure. The disclosure may further be specified as comprising, consisting or consisting essentially of, any of such combinations and permutations of these specific features, aspects, and embodiments, or a selected one or ones thereof.

Figure 1:
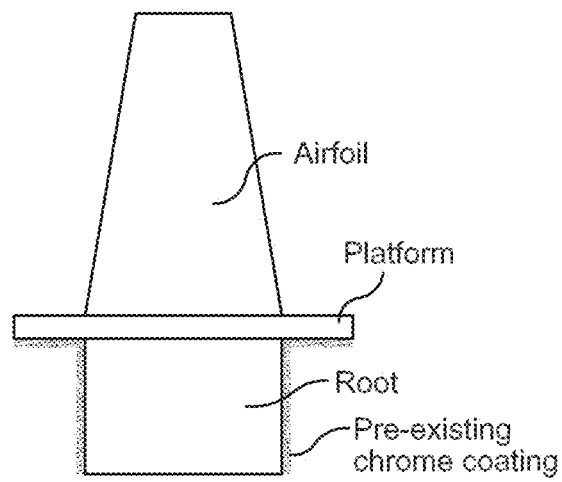
FIG. 1 is a schematic of a turbine blade having a pre-existing chromide coating in the under-platform region.

FIG. 1 shows a conventional turbine blade having an airfoil region, a platform region, and an under-platform region. A chromide coating is applied to the external surface of under-platform region by a conventional process, such as pack cementation, vapor phase processes, or slurry processes. A subsequent and separate aluminide coating is then applied only onto the internal and external surface of the airfoil regions, by conventional processes such as pack aluminizing, chemical vapor deposition, vapor phase aluminizing, or slurry aluminizing. During the aluminizing process, the deposition of aluminide coating over the chromide coating in accordance with the present invention is substantially prevented, as is chromium depletion from the chromide coating. The avoidance of (i) aluminide coating deposition onto the chromide coating; and (ii) chromium depletion by the present invention allows sustainable performance of chromide coating against type II hot corrosion that is substantially maintained during the service lifetime of the coated turbine blade.

Figure 2:
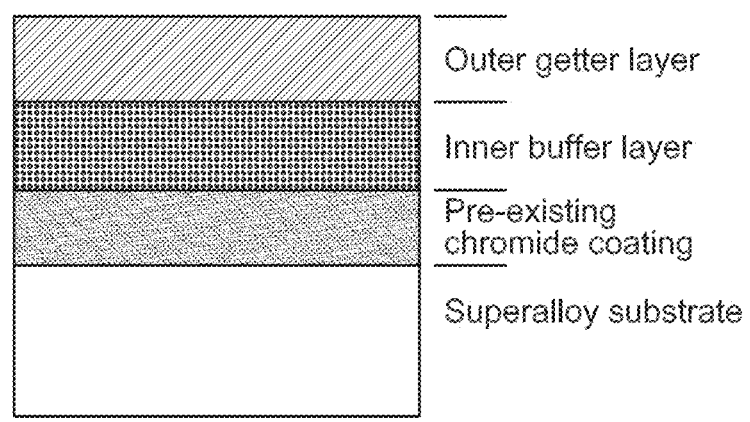
FIG. 2 is a schematic of a mask composition in accordance with the present invention comprising dual layer: an inner buffer layer and an outer getter layer.

Referring to FIG. 2, the mask material of the present invention comprises an inner buffer layer and an outer getter layer overlaying the inner buffer layer. Each layer has a different composition for purposes of achieving a specific function.

The inner layer is in direct contact with the surface of the pre-existing chromide coating on the selected region. The inner layer acts as a buffer between the outer layer and the underlying and pre-existing chromide coating ("inner buffer layer"). The inner layer comprises a mixed chromium-based powder (e.g., elemental or alloyed form) and inert ceramic powder in a binder solution. The inner buffer layer comprises from about 25 to about 65 weight percent of metallic chromium based on the total weight of the inner buffer layer. Chromium-based powder in the inner layer can prevent the chromium depletion from the pre-existing chromide coating by providing a buffer between the pre-existing chromide coating and masking materials used in the outer later. Furthermore, chromium-based powder in the inner layer can further getter and completely remove any residual aluminizing coating gases that may penetrate through the outer layer. The inert ceramic powder functions to prevent the sintering of the chromium-based powder during high-temperature diffusion process, and therefore slurry residues can readily be removed from the surface of the pre-existing chromide coating after aluminizing process. The inert ceramic powder is preferably alumina, kaolinite or zirconia. The inner buffer layer comprises from about 20 to about 65 weight percent of inert ceramic powder based on the total weight of the inner buffer layer. The binder solution functions to hold the mixed solid powders together without detrimentally interfering with the slurry constituents or the coated substrate. The binder is capable of burning off cleanly and completely during high-temperature aluminizing process. A preferred binder is hydroxypropylcellulose, which is commercially available under the trade name Klucel™, from Ashland Incorporation. Other binders may also be suitable for the present invention, including by way of example, a B-200 binder commercially made and sold by APV Engineered Coatings (Akron, Ohio).

Chromium-based powder in the inner layer can prevent the chromium depletion from the pre-existing chromide coating by providing a buffer between the pre-existing chromide coating and masking materials in the outer layer. To prevent chromium depletion from the underlying chromide coating, the chromium activity in the inner layer is designed with a formulation that is equal to or higher than in the underlying and pre-existing chromide coating. "Activity" is a measure of the "effective concentration" of a species in a mixture in chemical thermodynamics. The activity of pure substance is unity. Preferably, the chromium activity in the inner layer is equal to or higher than chromium activity in the chromide coating, which is typically greater than about 0.2. In one embodiment, elemental chromium powder with unit activity or chromium alloy powder with chromium activity greater than 0.2 is employed. In a preferred embodiment, the inner buffer layer is characterized by no greater than 5 weight percent of metallic aluminum based on the total weight of the inner buffer layer. In a more preferred embodiment, the inner buffer layer is characterized by the absence of metallic aluminum. The presence of greater than 5 weight percent of metallic aluminum in the inner layer deteriorates the function of inner buffer layer by reacting with underlying chromide coating and/or retaining any residual aluminizing coating gases that may penetrate through the outer layer.

Still referring to FIG. 2, an outer layer is overlying the inner layer and directly exposed to the aluminizing coating gases during high-temperature aluminizing process. The outer layer acts as a getter, which can react with aluminizing coating gases and therefore substantially restrict inward penetration of aluminizing coating gases to the surface of the pre-existing chromide coating during the high-temperature aluminizing process ("outer getter layer"). The outer getter layer comprises from about 10 to about 80 weight percent of metallic nickel based on the total weight of the outer getter layer. Nickel in the outer getter is a sacrifice by chemically reacting with aluminizing coating gases generated in the high-temperature aluminizing process and thus substantially restricting the amount of aluminizing coating gases that can reach inner buffer layer and pre-existing chromide coating. In one embodiment, elemental nickel powder or nickel alloy powder is employed. In a preferred embodiment, the outer getter layer comprises less than 10 weight percent of metallic aluminum based on the total weight of the outer getter layer. Applicants have discovered that more than about 10 wt. % of metallic aluminum in the outer getter layer can significantly reduce getter efficiency of nickel powder in the outer layer.

Further, the present invention has discovered that chromium content in the outer layer is formulated so as to be contained in an amount that is substantially less than the Cr content in the inner layer. Applicants have discovered that elevated Cr levels in the outer layer impairs the ability of the outer layer to getter and confine the aluminizing coating gases therewithin, thereby reducing masking efficiency to unacceptable levels. In this regard, the present invention specifically maintains Cr levels to a minimum to achieve optimal masking efficiency. In a preferred embodiment, the chromium content in the outer layer is maintained below about 5 weight percent based on the total weight of the outer layer. In another preferred embodiment, the chromium content in the outer layer is non-detectable, approaching substantially zero, based on the total weight of the outer layer.

The outer layer comprises from about 20 to about 65 weight percent of inert ceramic powder based on the total weight of the inner buffer layer. The inert ceramic powder is preferably alumina, kaolinite or zirconia.

Various getter materials can be utilized, including namely M-1, M-7 and M-17, all of which are commercially available from APV Engineered Coatings (Akron, Ohio). Representative formulation for M-1 is 30-60 weight percent of metallic nickel, 3-8 weight percent of metallic aluminum, 0.5-1.5 weight percent of metallic chromium and balanced with alumina powder. Representative formulation for M-7 is 50-80 weight percent of metallic nickel and balanced with alumina powder. M-17 is a masking powder combining M-1 and M-7.

The outer layer can be prepared to form a slurry layer which comprises a mixture of nickel metal powder or nickel alloy powder, and inert ceramic powder in a binder solution. The outer layer can be also prepared in the form of a box filled with the mixed nickel metal powder or nickel alloy powder, and inert ceramic powder, whereby the part to be coated is immersed in the box.

The prevent invention provides a new mask composition that is superior to conventional mask materials and formulations. The present invention can effectively protect the pre-existing chromide coating during a subsequent aluminizing process. In particular, the mask formulation protects the pre-existing chromide coating from reactive gases generated during a high-temperature aluminizing process, thereby preventing the deposition of aluminide coating onto the surface of pre-existing chromide coating. By preventing the deposition of aluminum onto the underlying chromide coating, corrosion resistance of the existing underlying chrome coating is maintained. Further, the masking material is inert and does not react with the underlying chromide coating, which avoids chromium depletion from the chromide coating. All of these benefits of the present invention represent substantially improved corrosion resistance to the underlying and pre-existing chromide coatings on a turbine component, in comparison to conventional masking materials. As such, the mask material of the present invention serves as an effective environmental barrier having performance characteristics not previously attainable with conventional masking materials.

The advantages of the present invention are substantiated by the following comparative examples and examples.

COMPARATIVE EXAMPLE 1

Commercially Available M-1/M-7 Maskant

A test was conducted to evaluate the performance of commercially available M-1/M-7 dual layer mask composition which has been widely used in aluminide coating industry. The turbine blade was made of a nickel-based superalloy having a nominal composition of, by weight of about 7.5% Co, 7.0% Cr, 6.5% Ta, 6.2% Al, 5.0% W, 3.0% Re, 1.5% Mo, 0.15% Hf, 0.05% C, 0.004% B, 0.01% Y and the balance nickel. The turbine blade had a pre-existing chromide coating on the under-platform region formed by a pack chromizing process. M-1/M-7 mask material was applied to the pre-existing chromide coating as a dual layer. The process was as follows:

a. Prepared a slurry by mixing 100 gram M-1 powder with 40 gram B-200 binder. Both M-1 powder and B-200 binder are commercially available from APV Engineered Coatings (Akron, Ohio). M-1 maskant comprises 30-60 weight percent of metallic nickel, 3-8 weight percent of metallic aluminum and 0.5-1.5 weight percent of metallic chromium balanced with alumina powder. The under-platform region of the turbine blade having a pre-existing chromide coating was then dipped into the M-1 slurry and was allowed to air dry for 1 h to form a slurry layer. Two dips of the M-1 slurry were applied to the surface of the under-platform region to form the inner layer.

b. Prepared a slurry by mixing 100 gram M-7 powder with 36 gram B-200 binder. Both M-7 powder and B-200 binder are commercially available from APV Engineered Coatings (Akron, Ohio). M-7 maskant powder comprises 50-80 weight percent of metallic nickel and balanced with alumina powder. The M-7 slurry was then applied over the M-1 inner layer and was allowed to air dry for 1 h. Two dips of M-7 slurry were applied and then slurry-coated blade was dried at 250° F. for 30 minutes to form the mask.

c. The slurry coated and dried blade was then loaded into a vapor phase aluminizing apparatus using Cr-30 wt. % Al nuggets and $AlF_3$ activator. The aluminizing process was carried out at 1975° F. for 4 hours in argon atmosphere.

Figure 3:
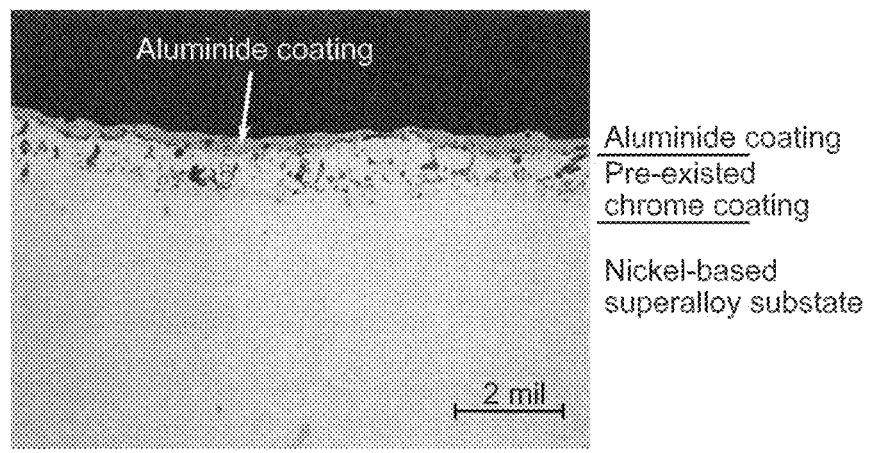
FIG. 3 shows a commercially available mask material (M-1/M-7 maskant from APV) creating deposition of aluminide coating over the pre-existing chromide coating.

After the part was cooled to room temperature, the residue of the mask slurry was readily removed by a lightly grit-blasting with −325 mesh alumina powder. The masked under-platform region was cross-sectioned for metallurgical analysis. The result is shown in FIG. 3. An aluminide coating with an average thickness of 0.3 mils was formed over the pre-existing chromide coating on the under-platform region, indicating the penetration of substantial amount of aluminizing coating gases through the M-1/M-7 mask material and a poor mask capability of the commercially available M-1/M-7 system on the pre-existing chromide coating during the aluminizing process. The test indicated poor masking.

COMPARATIVE EXAMPLE 2

Commercially Available M-17 Maskant

A test was performed to evaluate the performance of commercially available M-17 mask material which has been widely used in aluminide coating industry. The turbine blade was a nickel-based superalloy having a nominal composition of, by weight, about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel. The turbine blade had a pre-existing chromide coating on the under-platform region formed by a pack chromizing process. A commercial available masking material system was applied to the pre-existing chromide coating. The process was as follows:

a. Prepared a slurry by mixing 100 gram M-17 powder with 32 gram B-200 binder. Both M17 powder and B-200 binder are commercially available from APV Engineered Coatings (Akron, Ohio). M17 is a masking powder combining M-1 and M-7 which when used in slurry form does not necessarily require separate coats of M-1 and M-7. The under-platform region of turbine blade was then dipped into the M-17 slurry and was allowed to air dry for 1 h to form a slurry layer. Four dips of M-17 slurry were applied to the surface of under-platform region. The slurry-coated blade was dried in oven at 250° F. for 30 minutes.

b. The slurry coated and dried part was then loaded into a vapor phase aluminizing apparatus using Cr-30 wt. % Al donor nuggets and $AlF_3$ activator. The aluminizing process was carried out at 1975° F. for 4 hours in argon atmosphere.

Figure 4:
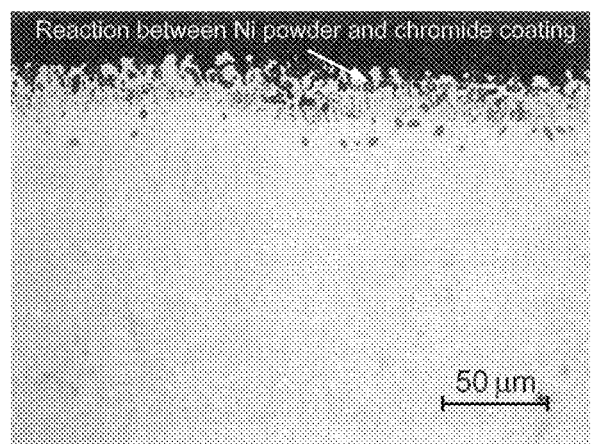
FIG. 4 shows that the use of a commercially available mask material (M-17 maskant from APV) leads to the reaction between mask materials and the pre-existing chromide coating, and chromium depletion from the pre-existing chromide coating.

After the part was cooled to room temperature, the residue of the mask slurry was readily removed by a lightly grit-blasting with −325 mesh alumina. The masked under-platform region was cross-sectioned for metallurgical analysis. The result is shown in FIG. 4. It was observed and determined that a chemical reaction occurred between M-17 mask material and the pre-existing chromide coating, which led to the chromium depletion from the pre-existing chromide coating. The test indicated poor masking.

COMPARATIVE EXAMPLE 3

Maskant from US Patent Application Pub. No. US20140287143

A test was performed to evaluate the performance of masking material disclosed in the prior art, US patent application US20140287143. The turbine blade was made of a nickel-based superalloy having a nominal composition of, by weight, about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel. The turbine blade had a pre-existing chromide coating on the under-platform region formed by a pack chromizing process. A masking material system disclosed by prior art, US20140287143, was applied to the pre-existing chromide coating. The process was as follows:

a. Prepared a slurry by mixing 80 gram M-1 powder and 20 gram chromium metal powder (−325 mesh) with 36 gram B-200 binder. Both M1 powder and B-200 binder are commercially available from APV Engineered Coatings (Akron, Ohio). M-1 maskant comprises 30-60 weight percent of metallic nickel, 3-8 weight percent of metallic aluminum, and 0.5-1.5 weight percent of metallic chromium balanced with alumina. The under-platform region of turbine blade was then dipped into slurry and was allowed to air dry for 1 h to form a slurry layer. Four dips of slurry were applied to the surface of under-platform region. The slurry-coated blade was dried in oven at 250° F. for 30 minutes.

b. The slurry coated and oven-dried part was then loaded into vapor phase aluminizing apparatus using Cr-30 wt. % Al donor nuggets and $AlF_3$ activator. The aluminizing process was carried out at 1975° F. for 4 hours in argon atmosphere.

Figure 5:
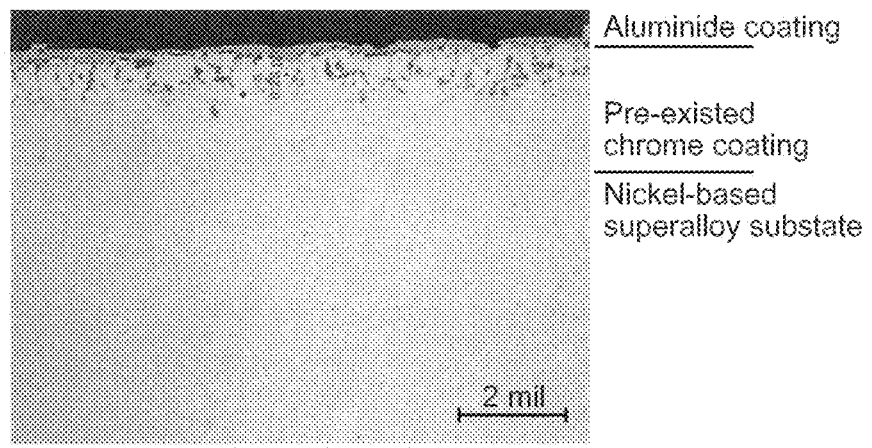
FIG. 5 shows that the use of a mask material from US Patent Application Pub. No. US20140287143 leads to the deposition of aluminide coating over the pre-existed chromide coating.

After the part was cooled to room temperature, the residue of mask slurry was readily removed by a lightly grit-blasting with −325 mesh alumina. The masked under-platform region was cross-sectioned for metallurgical analysis. The result is shown in FIG. 5. An aluminide coating with average thickness of 0.2 mils was formed over the pre-existing chromide coating on the under-platform region. The test indicated poor masking.

EXAMPLE 1

A test was performed to evaluate the performance of the inventive masking materials on a turbine blade. A turbine blade made of a nickel-based superalloy having a nominal composition of, by weight, about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel. The turbine blade had a pre-existing chromide coating on the under-platform region formed by a pack chromizing process. A dual layer masking material system of the present invention was applied to the pre-existing chromide coating. The process was as follows:

a. Prepared a slurry by mixing 50 gram elemental chromium powder and 50 gram alumina with 52 gram B-200 binder. B-200 binder is commercially available from APV Engineered Coatings (Akron, Ohio). The under-platform region of turbine blade was then dipped into slurry and was allowed to air dry for 1 h to form a slurry layer. 2 dip of slurry was applied to the surface of under-platform region.

b. Prepared a slurry by mixing 100 gram M-1 powder with 40 gram B-200 binder. Both M-1 powder and B-200 binder are commercially available from APV Engineered Coatings (Akron, Ohio). M-1 maskant comprises 30-60 weight percent of metallic nickel, 3-8 weight percent of metallic aluminum and 0.5-1.5 weight percent of metallic chromium balanced with alumina powder. The under-platform region of turbine blade was then dipped into slurry and was allowed to air dry for 1 h. 2 dips of slurry were applied to the surface of under-platform region. The slurry-coated blade was dried in oven at 250° F. for 30 minutes.

c. The slurry coated and dried part was then loaded into vapor phase aluminizing apparatus using Cr-30 wt. % Al donor nuggets and $AlF_3$ activator. The aluminizing process was carried out at 1975° F. for 4 hour in argon atmosphere. After the part was cooled to room temperature, the residue of mask slurry was readily removed by a lightly grit-blasting with −325 mesh alumina.

Figure 6:
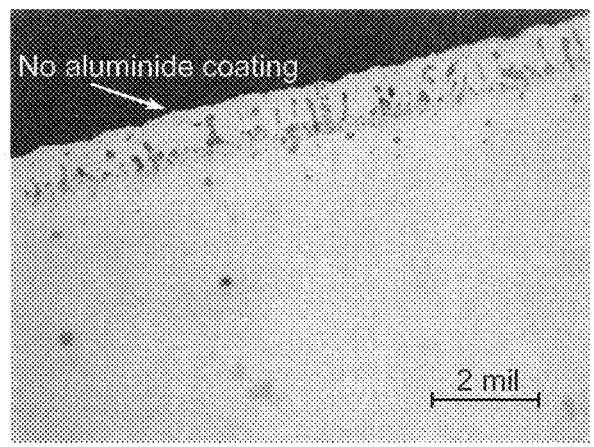
FIG. 6 shows that the use of a mask material in accordance with the principles of the present invention prevents the deposition of aluminide coating over the pre-existed chromide coating.

The masked under-platform region was cross-sectioned for metallurgical analysis. The result is shown in FIG. 6. Neither aluminide coating deposition on the masked region nor chemical reaction between mask material of present invention and the pre-existing coating (i.e., no chromium depletion from the underlying coating) was observed, indicating a mask efficiency and performance of the present invention superior to those of Comparative Examples 1-3.

EXAMPLE 2

A test was performed to evaluate the performance of the inventive masking materials on a turbine blade. A turbine blade made of a nickel-based superalloy having a nominal composition of, by weight, about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel. The turbine blade had a pre-existing chromide coating on the under-platform region formed by a pack chromizing process. A dual layer masking material system of the present invention was applied to the pre-existing chromide coating. The process was followed:

a. Prepared a slurry by mixing 50 gram elemental chromium powder and 50 gram alumina (−325 mesh) with 52 gram B-200 binder. B-200 binder is commercially available from APV Engineered Coatings (Akron, Ohio). The under-platform region of turbine blade was then dipped into slurry and was allowed to air dry for 1 h to form a slurry layer. 2 dip of slurry was applied to the surface of under-platform region to form the inner layer.

b. Prepared a slurry by mixing 100 gram M-7 powder with 32 gram B-200 binder. Both M7 powder and B-200 binder are commercially available from APV Engineered Coatings (Akron, Ohio). M-7 maskant powder comprises 50-80 weight percent of nickel and balanced with alumina powder. The under-platform region of turbine blade was then dipped into slurry and was allowed to air dry for 1 h. 2 dips of slurry were applied to the surface of under-platform region. The slurry-coated blade was dried in oven at 250° F. for 30 minutes to form the outer layer.

c. The slurry coated and oven-dried part was then loaded into vapor phase aluminizing apparatus using Cr-30 wt. % Al donor nuggets and $AlF_3$ activator. The aluminizing process was carried out at 1975° F. for 4 hours in argon atmosphere. After the part was cooled to room temperature, the residue of mask slurry was readily removed by a lightly grit-blasting with −325 mesh alumina.

Figure 7:
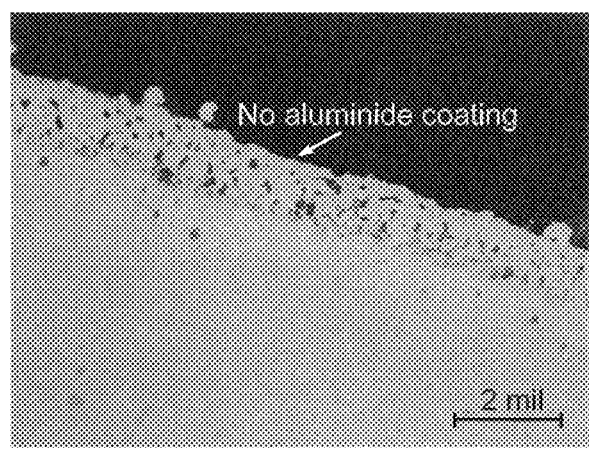
FIG. 7 shows that the use of a mask material in accordance with the principles of the present invention prevents the deposition of aluminide coating over the pre-existed chromide coating.

The masked under-platform region was cross-sectioned for metallurgical analysis. The result is shown in FIG. 7. Neither aluminide coating deposition on the masked region nor chemical reaction between the mask material of present invention and pre-existing and underlying chromide coating was observed, indicating a mask ability and performance of the present invention superior to those of Comparative Examples 1-3.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A mask composition having a dual layer that prevents aluminizing of selected regions of a turbine component having a pre-existing and underlying chromide coating, said dual layer comprising:
    an inner buffer layer consisting essentially of a slurry of mixed chromium-based powder and an inner inert ceramic powder in a binder solution, said inner buffer layer characterized by an absence of a halide activator; and
    an outer getter layer overlying said inner buffer layer consisting essentially of a nickel-based powder, an outer inert ceramic powder and no greater than 5 weight percent of metallic chromium based on a total weight of the outer getter layer;
    wherein said mask composition substantially prevents an aluminide coating deposition onto said pre-existing and underlying chromide coating, and prevents chromium depletion from said pre-existing and underlying chromide coating, thereby maintaining the structural integrity of the pre-existing and underlying chromide coating.

2. The mask composition of claim 1, wherein each of said inner inert ceramic material and said outer inert ceramic material is selected from the group consisting of alumina, kaolinite and zirconia.

3. The mask composition as in claim 1, wherein the inner buffer layer comprises from about 25 to about 65 weight percent of metallic chromium based on the total weight of the inner buffer layer.

4. The mask composition as in claim 1, wherein the inner buffer layer comprises no greater than about 5 weight percent of metallic aluminum based on the total weight of the inner buffer layer.

5. The mask composition as in claim 1, wherein the inner buffer layer is characterized by the absence of metallic aluminum.

6. The mask composition of claim 1, wherein the outer getter layer comprises from about 10 to about 80 weight percent of metallic nickel based on the total weight of the outer getter layer.

7. The mask composition of claim 1, wherein the outer getter layer comprises substantially less metallic chromium than that of the inner buffer layer.

8. The mask composition of claim 1, wherein said outer getter layer is characterized by the absence of metallic chromium.

9. The mask composition of claim 1, wherein said outer getter layer comprises no greater than about 10 weight percent of metallic aluminum based on the total weight of the outer getter layer.

10. The mask composition of claim 1, wherein said outer getter layer is characterized by the absence of metallic aluminum.

11. The mask composition as claim 1, wherein the outer getter layer is a slurry.

12. The mask composition of claim 1, wherein the outer getter layer is a box filled with the mixture of nickel-based alloy powder, and inert ceramic powder.

13. The mask composition of claim 1, wherein said outer getter layer comprises 50-80 weight percent of metallic nickel based on the total weight of the outer getter layer.

14. The mask composition of claim 1, wherein said outer getter layer comprises 30-60 weight percent of metallic nickel, 3-8 weight percent of metallic aluminum, and 0.5-1.5 weight percent of metallic chromium based on the total weight of the outer getter layer.

15. The mask composition having the dual layer of claim 1, wherein said inner buffer layer is overlying the pre-existing and underlying chromide coating, and said pre-existing and underlying chromide coating is on the selected regions of the turbine component.

16. The mask composition having the dual layer of claim 1, wherein said turbine component comprises other regions characterized by an absence of the pre-existing and underlying chromide coating and an absence of the dual layer, and further wherein said other regions are characterized by a diffusion aluminide coating.

* * * * *